United States Patent Office 3,076,335
Patented Feb. 5, 1963

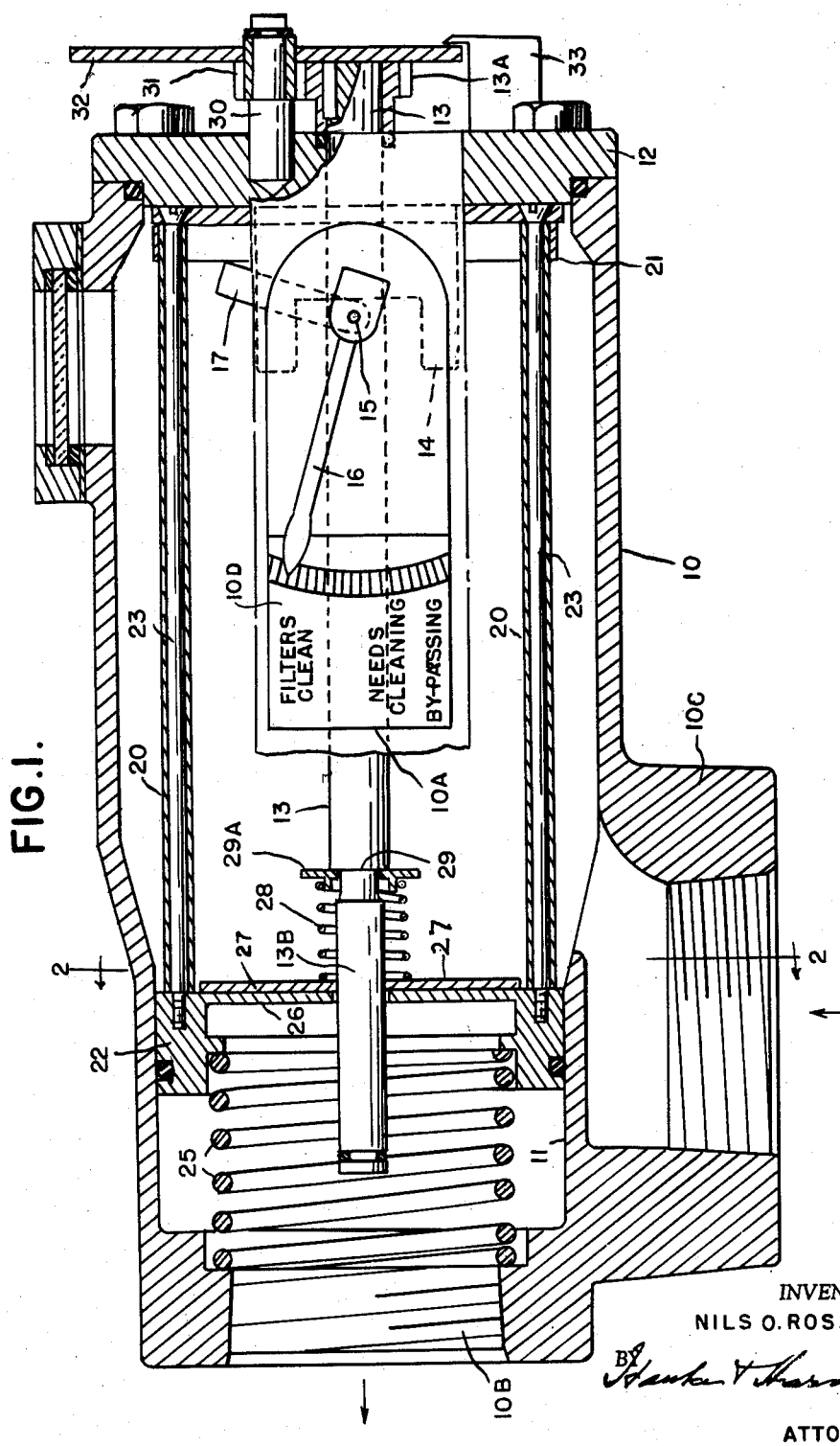

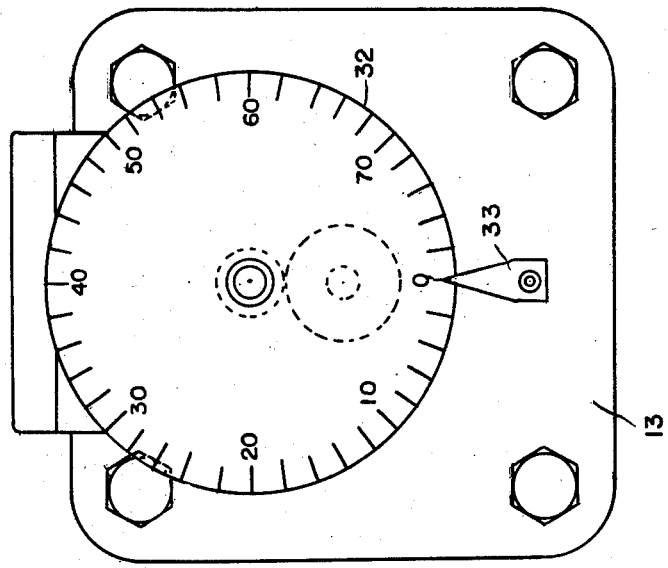
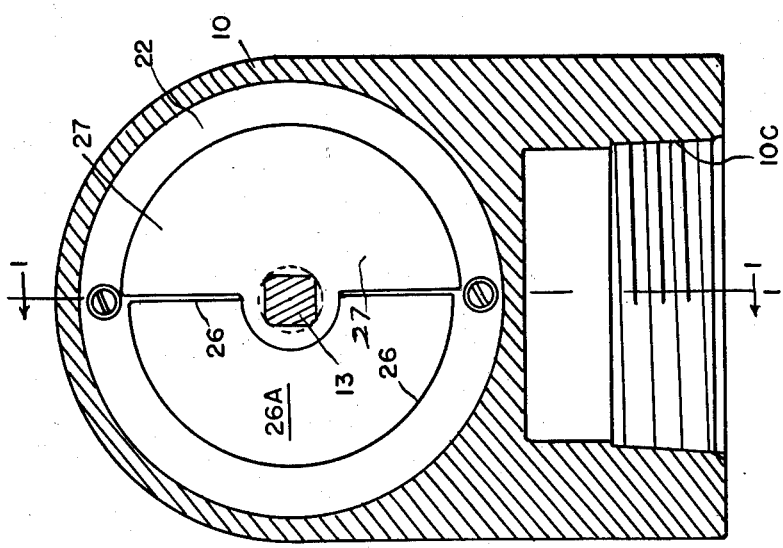

3,076,335
MEANS FOR CHECKING HYDRAULIC INSTALLATIONS
Nils O. Rosaen, Detroit, Mich., assignor to The Rosaen Filter Company, Hazel Park, Mich., a corporation of Michigan
Filed Dec. 22, 1958, Ser. No. 782,369
4 Claims. (Cl. 73—198)

The present invention relates to means for checking hydraulic installations involving a filter, pump and delivery circuits to points of use of the filtered fluid, specifically oil.

Among the objects of the invention is to provide a simple, easily usable means for insertion into the installation without dismantling or disconnecting the several elements for determining the rate of flow of the fluid in the hydraulic system and hence the efficiency of the hydraulic installation and its component parts.

Another object is to provide a simple means whereby to check the efficiency of the pump used in such installations.

Other objects and advantages will be apparent to those skilled in the art upon reference to the following description and the accompanying drawings in which FIGURE 1 is a central longitudinal section with parts in elevation.

FIGURE 2 is a section on line 2—2 of FIGURE 1.

FIGURE 3 is an end elevation as from the right of FIGURE 1.

The subject of this invention embodies a flow meter consisting of two basic parts, a meter cartridge, which is in effect a sliding piston mechanism, and a housing therefor, the housing being in this instance a housing which is normally used for and forms part of an oil filter of the slidable cartridge type, and particularly such oil filters as are manufactured by The Rosaen Company of Hazel Park, Michigan, and sold under the trademark "TELL-TALE."

Oil filters of this type employ a cylindrical filter cartridge which is mounted within the housing in such a manner as to be axially movable or slidable therein responsive to changes in differential pressure of the fluid between the inlet and outlets of the housing when the system is in operation. If the unit is a suction type of filter, the outlet of the filter is generally connected to the intake of the pump in the system and the inlet of the filter is connected to the oil reservoir.

Normally such filter cartridges are spring biased to keep a by-pass valve closed so that the entire flow of fluid normally passes through the cylindrical walls of the filter cartridge to be cleaned thereby. However, as the filter element gradually becomes dirty by collection of deposits strained from the fluid with the interstices becoming gradually clogged, such clogging will result in the differential pressure between the inlet and outlet of the unit gradually increasing until the spring bias is overcome and the filter cartridge then begins to move axially in the housing responsive to such pressure, thus compressing the spring. The axial movement of the cartridge is analogous to a piston having different pressures on opposite sides thereof. When the filter cartridge has moved an appreciable distance, a by-pass valve opening is uncovered to permit the incoming oil to by-pass the filter element and pass directly through to the outlet, thus protecting the hydraulic system from damage.

Indicating means is also provided exteriorly of the casing for indicating the position of the axially movable filter cartridge in the housing and hence the condition of said filter prior to the actual opening of the by-pass valve. The indicating means is actuated by means responsive to the movement of the cartridge.

The present invention relates to a flow meter cartridge which may be substituted for the forementioned oil filter cartridge in the same filter housing whenever it is desired to quickly check the rate of flow in the hydraulic system. In other words, the unit is interchangeable with the filter cartridge and uses the same housing and associated parts.

With the foregoing explanation the subject matter of the present invention will be clear by reference to the drawings in which the numeral 10 designates a filter housing being internally cylindrical but provided with a longitudinally extending plate like boss 10A on its outer wall carrying a suitable legend plate 10D, the housing comprising also an axially arranged outlet 10B and a depending inlet 10C. Within the housing at the outlet end, the wall is formed into a cylinder 11. At the other end, the housing 10 is closed by a suitable cover plate 12 having a central opening for the passage of a shaft 13 to the outer end of which is fixed a gear 13A by means of which the shaft may be rotated, and to the inner face of the plate is fixed a short tubular element 14 concentric with shaft 13. The short tubular element 14 constitutes a by-pass valve element when the housing is being used with a filter cartridge; but when the housing is used with the flow meter cartridge, the element 14 has no other function than to serve as a guide member for the right hand end of the unit as viewed in FIG. 1.

Extending through the plate like boss 10A is a short shaft 15 having fixed to its outward end an indicator hand 16 adapted to cooperate with suitable markings carried by the legend plate 10D mounted upon the boss as shown in FIG. 1.

To the inward end of the shaft 15 is fixed a crank arm 17, the actuation of which will rotate the hand 16.

When the housing is to be used for filtration, a filter cartridge is used which carries a filter in place of the spacing elements 20 shown in FIG. 1, as will be readily understood from the foregoing description.

The cartridge in the present devices comprises a flanged cap or plate 21 having a central opening for the short tubular valve element 14, which as heretofore mentioned in this case acts only as a guide. It also comprises the spacers 20, screws 23 and an annular piston 22, slidably fitted in cylinder 11. A suitable spring 25 thrusts the piston and cartridge axially toward the opposite end of the housing.

The piston 22 is provided with a half septum 26 having at the center of the piston an opening to receive the end of shaft 13, which, as shown in FIG. 2, is squared and fitted slidably in a suitable square opening in a semicircular valve plate 27, the half septum 26 leaving an opening 26A which may be fully opened or completely closed by the plate 27 when rotated by shaft 13.

The valve plate 27 is pressed against the piston by a suitable spring 28 acting between the plate and a shoulder 29 on shaft 13. It is preferred to provide a small annular plate 29A to be seated on the shoulder 29 and act as a seat for spring 28.

Carried by the outer face of the cover plate 12 is an eccentrically located stud 30 upon which is rotatably carried a gear 31 meshing with gear 13A, conveniently of half the size of the latter. Gear 31 has fixed to it, a dial 32, suitably graduated and cooperating with a stationary pointer 33. With the gearing as indicated, a complete revolution of the dial will rotate the valve plate 27 from fully open to fully closed position.

Since the primary purpose of the present device is to check the efficiency of the pump (not shown but whose intake is connected to the outlet 10B of the housing) being used in the system, the flow of fluid through the housing and into the system must be measured. This may be quite accurately done by calibrating the dial-valve combination (32—27) to enable an observer to note the amount of fluid being passed by the valve. With the proper selected spring 25 to give the desired pressure differential between inlet and outlet pressures or in effect on opposite sides of the piston 22, and across the orifice 26A therein, the dial can be readily calibrated in flow rates (gallons per minute, etc.) so that the precise rate of flow is readable directly from the dial. The dial must be calibrated in accord with the selected and known pressure differential.

When it is desired to determine the rate of flow of the fluid in a hydraulic installation which has incorporated therein oil filters of the type heretofore described, the filter cartridge is removed from the housing and the flow meter cartridge is inserted therein to take its place and the parts are assembled as shown in FIG. 1. Valve 27 is rotated to the open position by means of the dial 32 and the indicator hand 16 is manually rotated clockwise to the "Filters Clean" position shown in FIG. 1 with the end of the crank arm 17 bearing against the flanged cap 21. With the system in operation the flow of the fluid will be from inlet 10C past the spacer bars 20 to the interior of the cartridge and hence through the orifice 26A to the outlet 10B, the latter being connected to the intake side of the pump whose efficiency is being checked. The piston-like cartridge under these conditions is held outward against the direction of flow by the coil spring 25 in the position shown in FIG. 1. To measure a given flow of fluid, the opening 26A is gradually closed by movement of the valve plate 27 through the control wheel 32 until the flow is restricted sufficiently to bring about a difference in pressure on opposite sides of the opening great enough to overcome the resistance of the coil spring 25 at which time the piston-like cartridge will tend to move in the direction of the flow toward the outlet 10B and against the spring. This movement is clearly indicated to the observer by movement of the indicator hand 16 which is actuated by the flanged cap 21 and crank arm 17. By manipulation of the valve and at the same time observing the indicator hand, a balanced position of the piston may be obtained where the piston is being held in equilibrium by the differential pressure and spring pressure, the indicator hand being kept steady on a fixed point on the indicator plate 10D. When this condition is obtained the rate of flow is now known and can be read directly from the graduated control dial in gallons per minute or similar units. There are predictable ratios between every rate of flow and the orifice size necessary to induce a specific amount of pressure differential.

One of the advantages of the device is, of course, that, in a set up system, the pump may be checked without dismantling any more than is done in making a filter change. Thus one such meter can enable an operator to quickly check flow rates in any number of places in a system, wherever oil filters have been installed, and the efficiency of the system can be checked in a mere matter of minutes and without having to remove any piping, lines, or parts (other than the filter cartridge) and thus eliminate the need to install permanent and expensive metering units.

I claim:

1. A flow meter comprising an internally cylindrical housing having an outlet at one end and a laterally arranged inlet, the wall around said outlet being finished to provide a cylinder, a piston slidable in said cylinder and provided with an opening therethrough, a valve for said opening, said valve consisting of a plate rotatable about the piston axis to open and close said opening, spring means resisting movement of said piston toward said outlet, a plate fixed to said piston but spaced therefrom and disposed on the side thereof away from said outlet, a closure plate for the end of said housing opposite said outlet and carrying an axially arranged shaft extending to and operatively connected to said valve, said shaft extending through said closure plate, means movable in response to movement of said spaced plate to indicate movement of said piston against said spring means and means carried by said closure plate to rotate said shaft and valve and to indicate the condition of said valve and the rate of fluid flow therethrough for a predetermined movement of said piston.

2. A rate of flow meter adapted for use in a filter housing of the axially movable filter cartridge type provided with an interiorly formed cylinder at the outlet end of said housing, the opposite end being open for the reception of the filter cartridge, said housing having means for indicating movement of said cartridge in said housing, said flow meter being insertable within said housing in place of the filter cartridge and comprising a closure plate for the open end of said housing, a shaft extending through said closure plate and axially of said housing, a meter cartridge mounted for axial movement upon said shaft and including a piston at one end for slidable reception in said cylinder of the housing, spring bias means for maintaining the meter cartridge against the closure plate, said piston being provided with an orifice, a valve for said orifice adapted to be actuated by said shaft, means for positioning the meter cartridge within the housing so that movement of said cartridge will be transmitted to the same means for indicating movement of the filter cartridge so as to indicate movement of said meter cartridge against said spring bias means, and means carried by said closure plate to rotate said shaft and actuate said valve and to indicate the condition of said valve and the rate of fluid flow therethrough for a predetermined movement of said meter cartridge.

3. In combination a fluid filter housing having an inlet and an outlet and open at one end away from said outlet, an axially arranged cylinder formed in said housing within the other end and disposed between said inlet and outlet and opening to said outlet, a rate of flow meter unit for insertion within said filter housing including a piston slidably mounted in said cylinder and provided with a valved opening therethrough, spring means resisting movement of said piston toward said outlet, a closure for the open end of said housing carrying means for controlling said valved opening means movable in response to movement of said flow meter unit to indicate movement of said piston against said spring means and means carried by said closure to operate said control means for said valved opening and to indicate the condition of said opening and the rate of fluid flow therethrough for a predetermined movement of said piston.

4. A rate of flow meter adapted for use in a filter housing of the axially movable filter cartridge type provided with an interiorly formed cylinder at the outlet end of said housing, the opposite end being open for the reception of the filter cartridge, said housing having means for indicating movement of said cartridge in said housing, said flow meter being insertable within said housing in place of the filter cartridge and comprising a closure member for the open end of said housing, a shaft extending through said closure member and axially of said housing, a meter cartridge mounted for axial movement upon said shaft and including a piston at one end for slidable reception in said cylinder of the housing and spacer elements fixed to said piston and carrying a plate adjacent the other end of said housing, spring bias means for maintaining the meter cartridge against said closure member with said plate bearing thereagainst, said piston being provided with an orifice, a valve for said orifice adapted to be actuated by said shaft, means for positioning the meter cartridge within the housing so that movement of said cartridge will be transmitted through said plate to the same means for indicating movement of the filter cartridge so as to indicate movement of said meter cartridge against said spring bias means, and means carried by said closure plate to rotate said shaft and actuate said valve and to indicate the condition of said valve and the rate of fluid flow therethrough for a predetermined movement of said meter cartridge.

References Cited in the file of this patent

UNITED STATES PATENTS

| | | |
|---|---|---|
| 1,958,698 | Fox | May 15, 1934 |
| 2,131,486 | Spitzglass | Sept. 27, 1938 |
| 2,136,261 | Anderson | Nov. 8, 1938 |
| 2,399,938 | Pett | May 7, 1946 |
| 2,720,782 | Stein | Oct. 18, 1955 |
| 2,808,786 | Johnston | Oct. 8, 1957 |
| 2,859,612 | Morse | Nov. 11, 1958 |